US012593853B2

(12) United States Patent
Chung

(10) Patent No.: US 12,593,853 B2
(45) Date of Patent: Apr. 7, 2026

(54) SMOKING APPARATUS

(71) Applicant: REVOACE INC. LIMITED, Hong Kong (CN)

(72) Inventor: Kiosky Chung, Taichung (TW)

( * ) Notice: Subject to any disclaimer, the term of this patent is extended or adjusted under 35 U.S.C. 154(b) by 916 days.

(21) Appl. No.: 17/865,411

(22) Filed: Jul. 15, 2022

(65) Prior Publication Data

US 2024/0016168 A1 Jan. 18, 2024

(51) Int. Cl.
*A23B 4/052* (2006.01)
*A47J 37/07* (2006.01)

(52) U.S. Cl.
CPC ........... *A23B 4/052* (2013.01); *A47J 37/0786* (2013.01)

(58) Field of Classification Search
CPC ... A23B 4/052; A47J 37/0704; A47J 37/0718; A47J 37/0768; A47J 37/0731; F24B 13/02; F16B 12/32; F16B 12/34; F16B 12/36

USPC ................................................ 99/485; 126/25
See application file for complete search history.

(56) References Cited

U.S. PATENT DOCUMENTS

| | | | | |
|---|---|---|---|---|
| 6,012,381 | A | * | 1/2000 | Hawn ................. A47J 37/0713 |
| | | | | 99/450 |
| 10,799,067 | B2 | * | 10/2020 | Johnston ............. A47J 37/0786 |
| 11,391,464 | B2 | * | 7/2022 | Ahmed .................... F24B 1/026 |
| 2022/0296040 | A1 | * | 9/2022 | Frankline ........... A47J 37/0704 |
| 2023/0279887 | A1 | * | 9/2023 | Corso ................. A47J 37/0786 |

* cited by examiner

*Primary Examiner* — Thuyhang N Nguyen
(74) *Attorney, Agent, or Firm* — Bruce Stone LLP; Joseph A. Bruce

(57) ABSTRACT

A smoking apparatus includes a primary oven, a second oven and a rack. The primary oven includes a lateral wall formed with a recess and a vent located within the recess. The secondary oven includes a lateral wall formed with a bulge insertable in the recess, a vent located within the bulge, and a claw for hooking an upper edge of the lateral wall of the primary oven. The rack supports the primary oven.

10 Claims, 8 Drawing Sheets

SMOKING APPARATUS

BACKGROUND OF INVENTION

1. Field of Invention

The present invention relates to a smoking apparatus and, more particularly, to a smoking apparatus including a primary oven and a secondary oven.

2. Related Prior Art

A conventional smoking apparatus includes a primary oven, a secondary oven, and a rack. In use, the primary oven is supported on the rack. The secondary oven is attached to the primary oven by several screws. The screws can be untightened to allow the secondary oven to be detached from the primary oven if so desired. However, the attachment of the secondary oven to the primary oven is not reliable for depending on the screws only. The operation of the screws for the attachment or the detachment is troublesome.

The present invention is therefore intended to obviate or at least alleviate the problems encountered in the prior art.

SUMMARY OF INVENTION

It is the primary objective of the present invention to provide a smoking apparatus including a secondary oven attachable to a primary oven in a reliable manner.

To achieve the foregoing objective, the primary oven includes a lateral wall formed with a recess and a vent located within the recess. The secondary oven includes a lateral wall formed with a bulge insertable in the recess, a vent located within the bulge, and a claw for hooking an upper edge of the lateral wall of the primary oven. Smoking apparatus includes a primary oven, a second oven and a rack.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
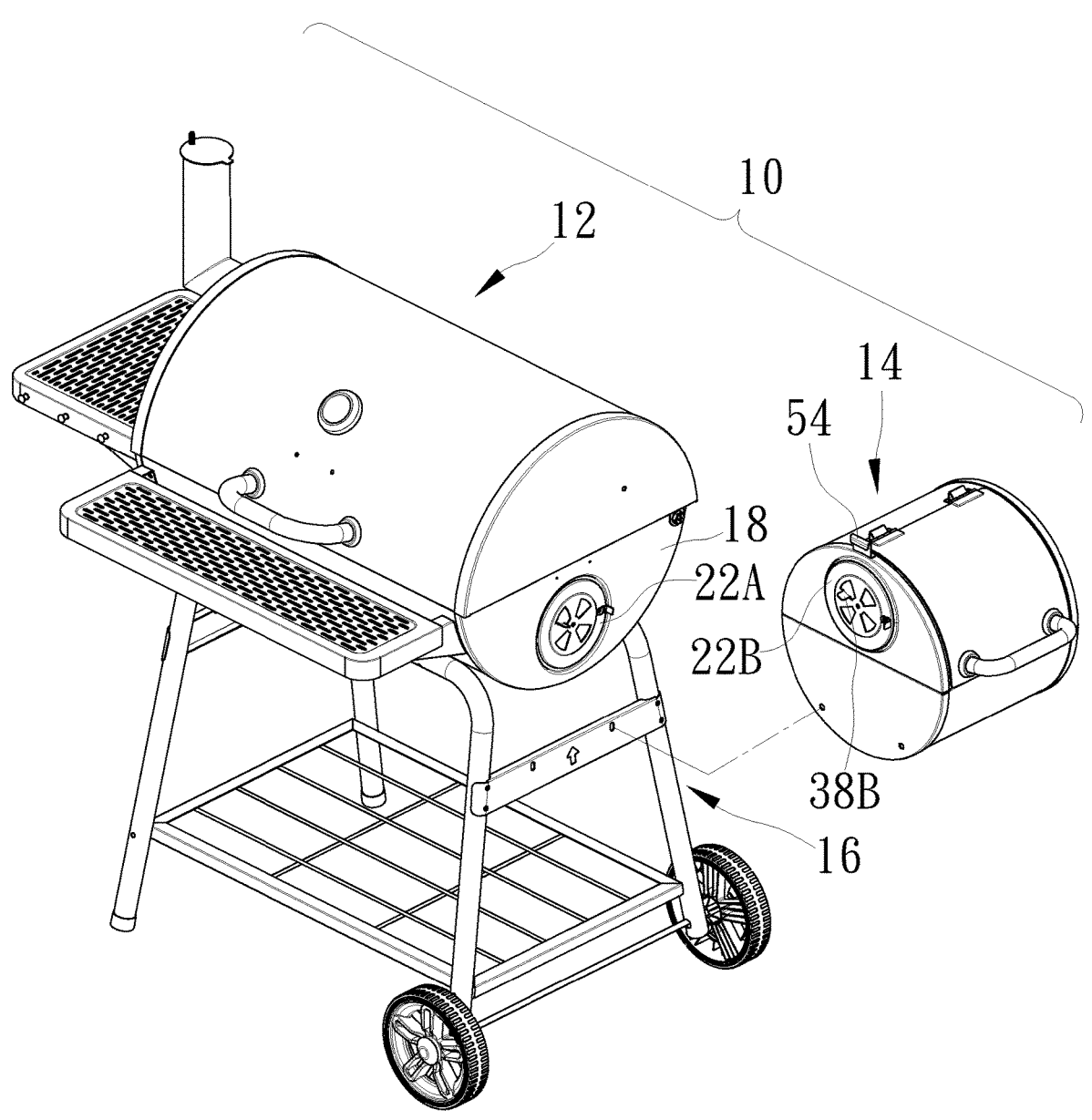
FIG. 1 is an exploded view of a smoking apparatus including a primary oven and a secondary oven according to the preferred embodiment of the present invention.
Figure 6:
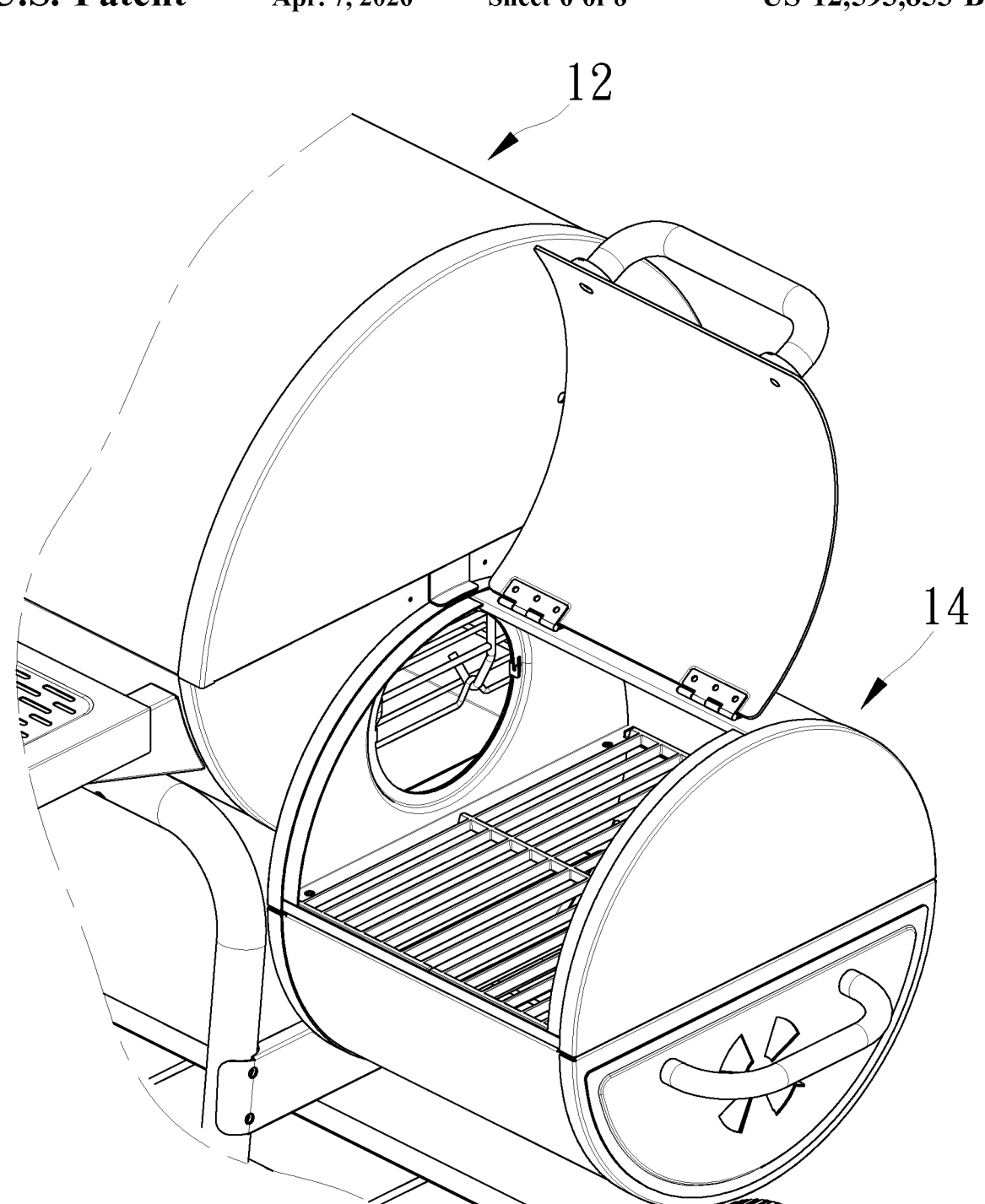
FIG. 6 is an enlarged partial view of the smoking apparatus shown in FIG. 1.
Figure 7:
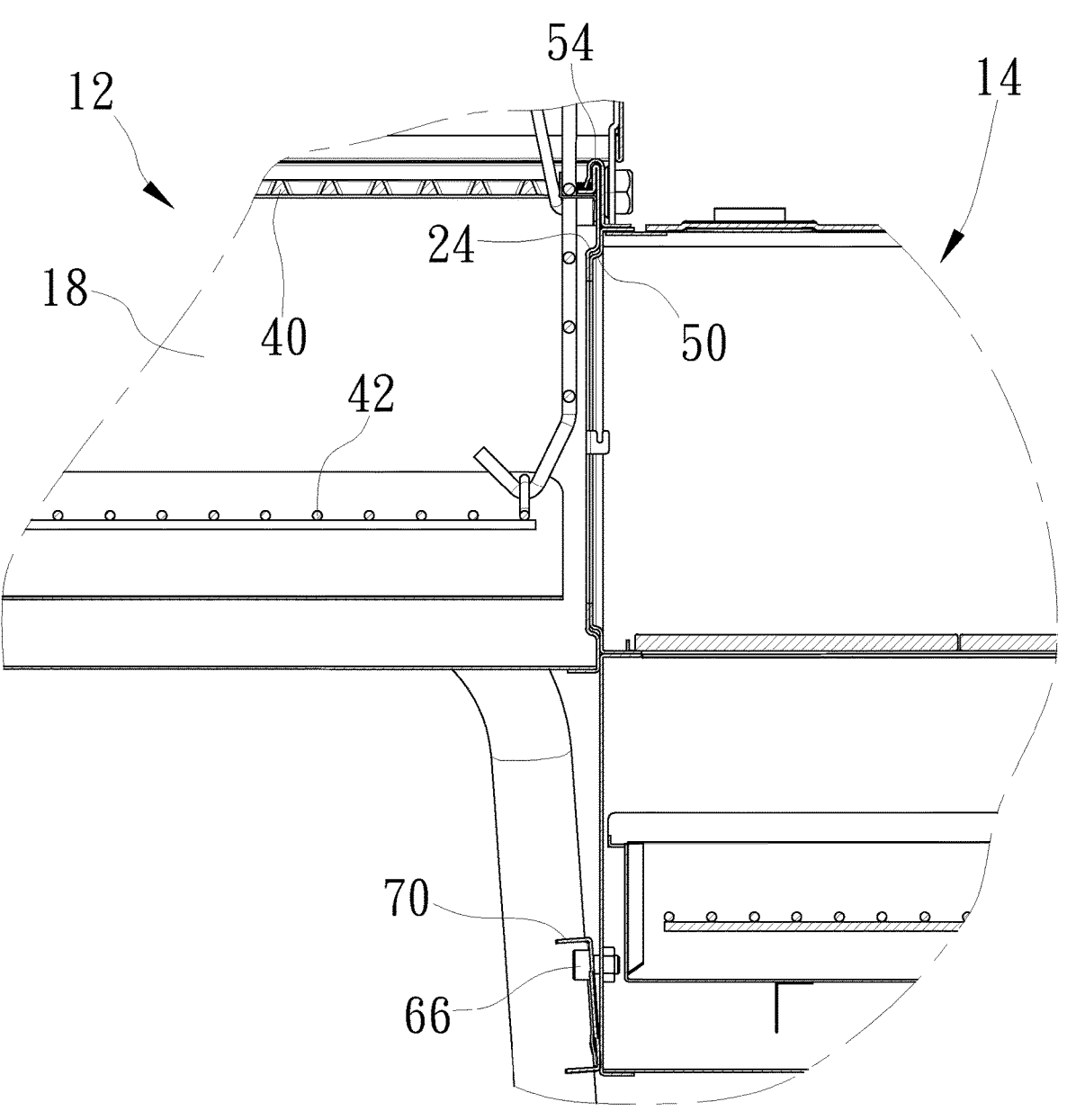
FIG. 7 is a cross-sectional view of the smoking apparatus depicted in FIG. 6.
Figure 8:
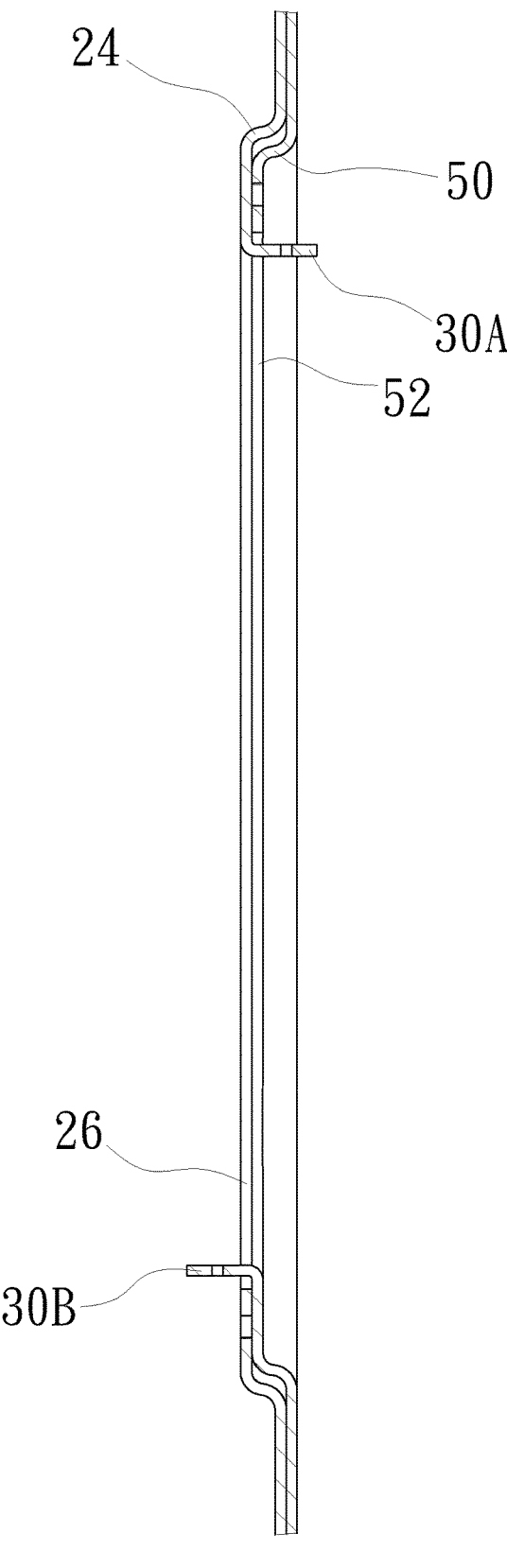
FIG. 8 is another cross-sectional view of the smoking apparatus shown in FIG. 6.

Referring to FIG. 1, a smoking apparatus 10 includes a primary oven 12, a secondary oven 14 and a rack 16 according to the preferred embodiment of the present invention. The secondary oven 14 can be detached from the primary oven 12 if so desired. Referring to FIGS. 6 through 8, in use, the primary oven 12 is supported on the rack 16, and the secondary oven 14 is attached to the primary oven 12. The attachment and detachment are easy.

Figure 2:
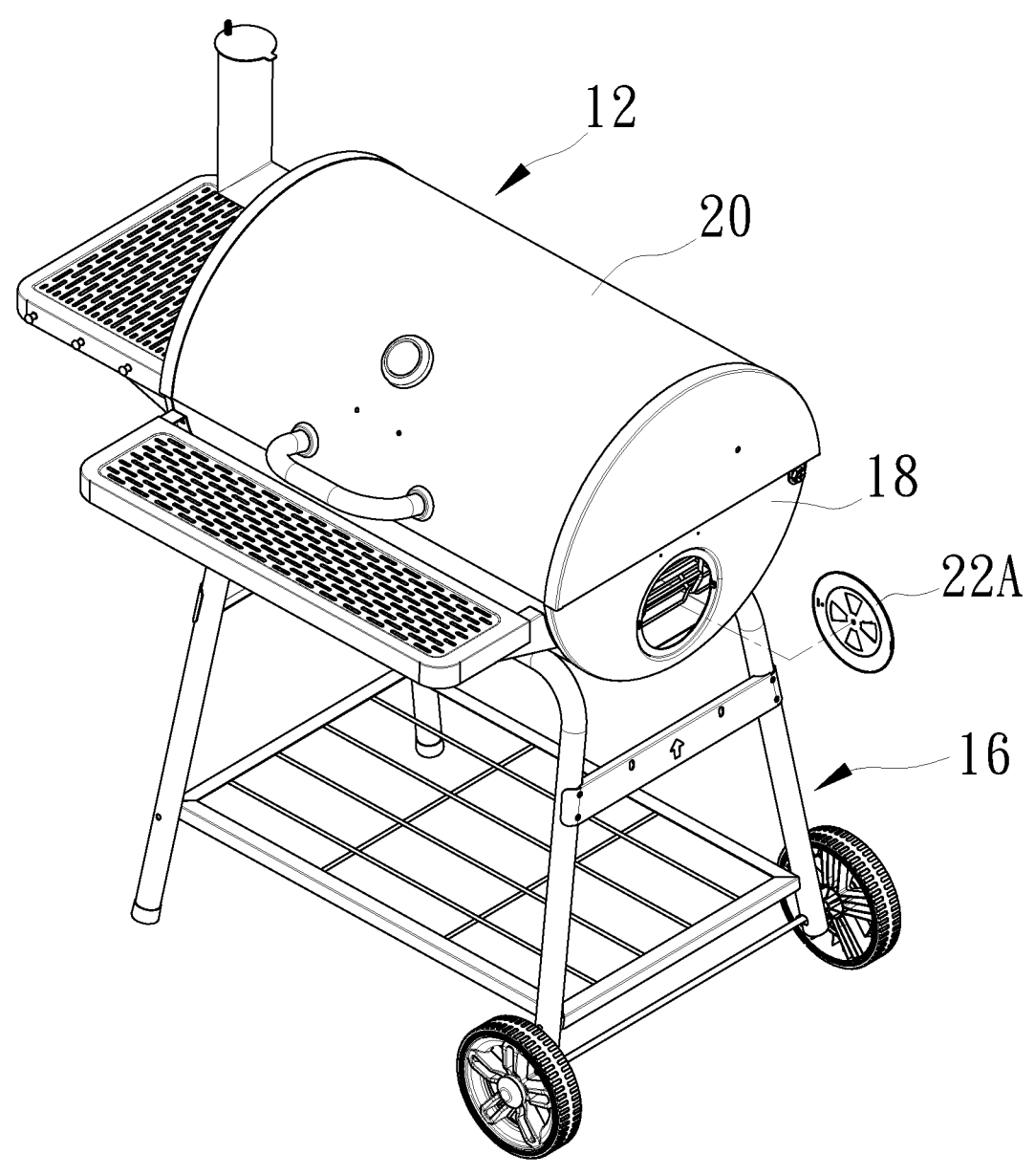
FIG. 2 is a perspective view of the primary oven shown in FIG. 1.

Referring to FIG. 2, the primary oven 12 includes a bowl 18, a lid 20 and a cover 22A. The bowl 18 is supported on and connected to the rack 16 in an appropriate manner. The lid 20 is pivotally connected to the bowl 18.

Figure 3:
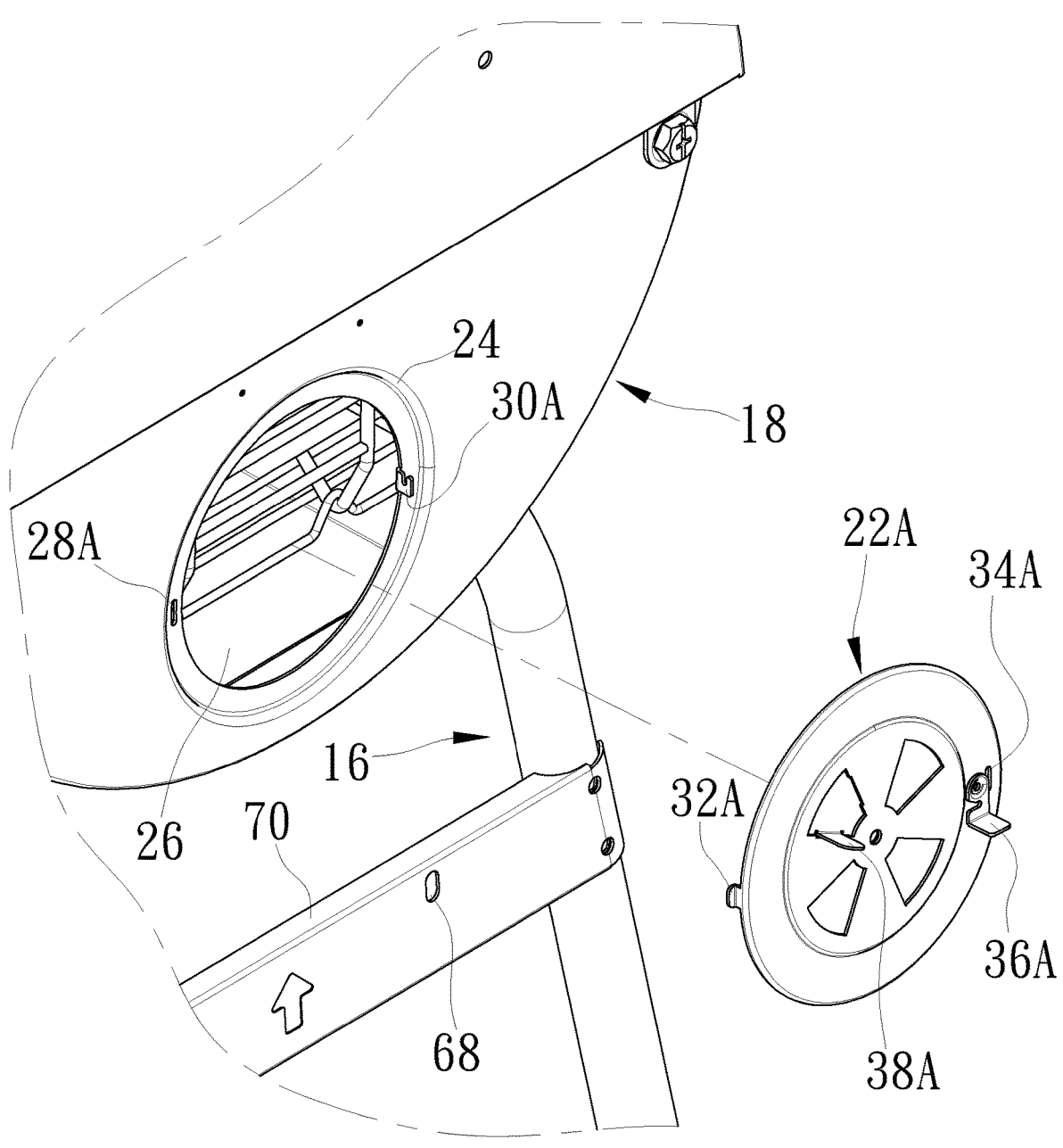
FIG. 3 is an enlarged partial view of the primary oven shown in FIG. 2.

Referring to FIG. 3, the bowl 18 includes a recess 24, a vent 26, a slot 28A and a hook 30A. The recess 24 is made in an external face of a lateral wall of the bowl 18. The vent 26 is made in the lateral wall of the bowl 18. Preferably, the recess 24 and the vent 26 are both circular and co-centric with each other. The slot 28A is cut in the lateral wall of the bowl 18. Preferably, the slot 28A is located within the recess 24. The hook 30A is formed on the lateral wall of the bowl 18. Preferably, the hook 30A is located within the recess 24. Preferably, the slot 28A and the hook 30A are located on two opposite sides of the vent 26.

The cover 22A includes a tongue 32A, a slot 34A, a shackle 36A and a tab 38A. The tongue 32A extends from a portion of an edge of the cover 22A. Preferably, the tongue 32A is a bent element formed with a root extending in perpendicular to the cover 22A and a tip extending in parallel to the cover 22A. The tongue 32A is shaped according to the slot 28A. The slot 34A is shaped in compliance with the hook 30A. The shackle 36A is a bent element formed with a first section extending in perpendicular to a second section. The first section of the shackle 36A is pivotally connected to the cover 22A. The first section of the shackle 36A is shaped like the hook 30A. The second section of the shackle 36A facilitates handling of the shackle 36A. The tab 38A extends from the cover 22A. The tab 38A facilitates handling of the cover 22A.

The vent 26 can be shielded by the cover 22A. To this end, the cover 22A is inserted in the recess 24. The tongue 32A is inserted in the slot 28A. The hook 30A is inserted in the slot 34A. The first section of the shackle 36A is engaged with the hook 30A.

The first section of the shackle 36A can be disengaged from the hook 30A. Thus, the cover 22A can be detached from the lateral wall of the bowl 18, thereby opening the vent 26.

Referring to FIG. 7, the primary oven 12 further includes a grid and a net 42. In use, the grid 40 is located within the bowl 18. The grid is used to support food. In use, the net 42 is located within the bowl 18, below the grid 40. The net 42 is used to support charcoal for example.

Figure 4:
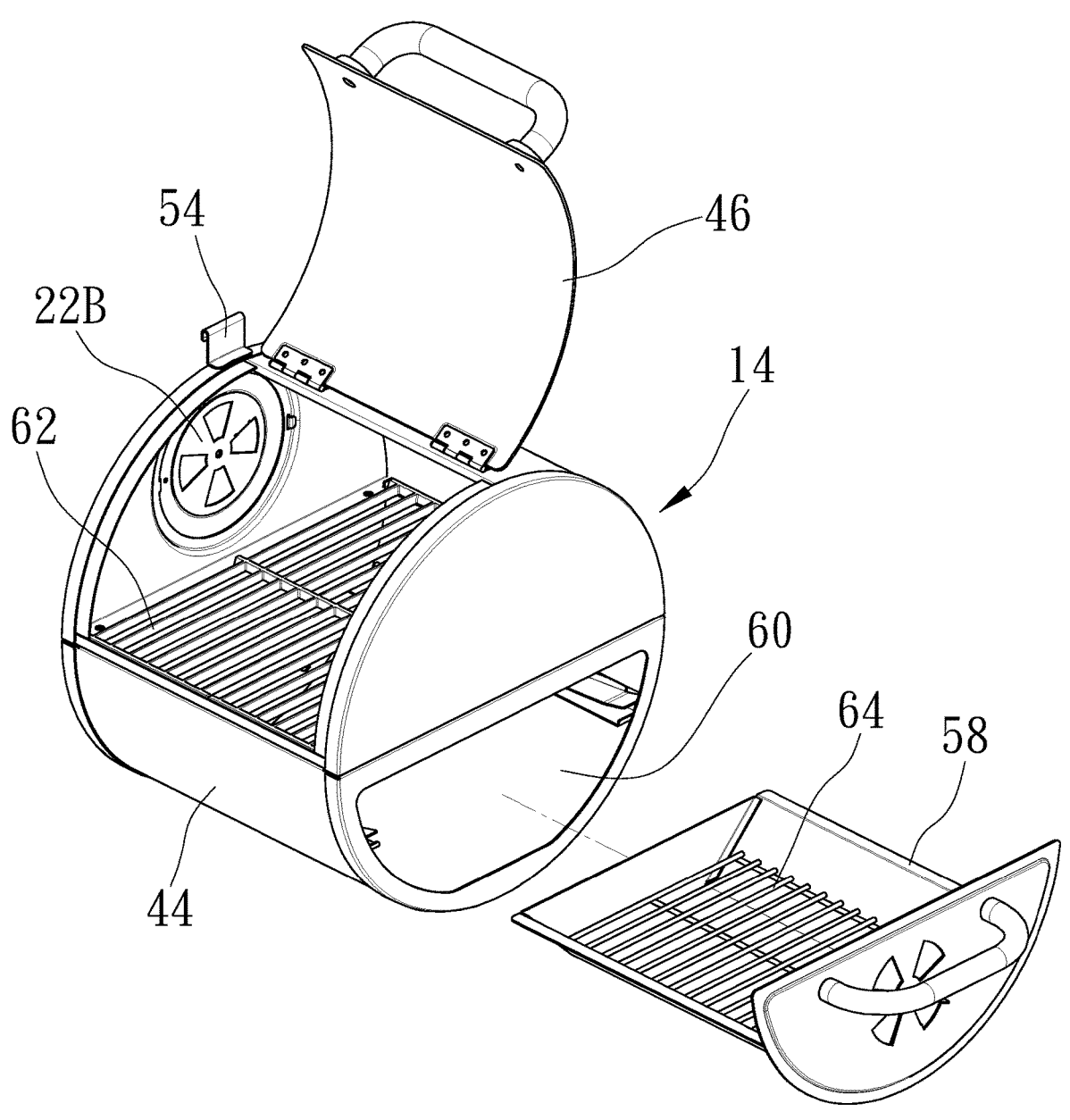
FIG. 4 is a perspective view of the secondary oven shown in FIG. 1.
Figure 5:
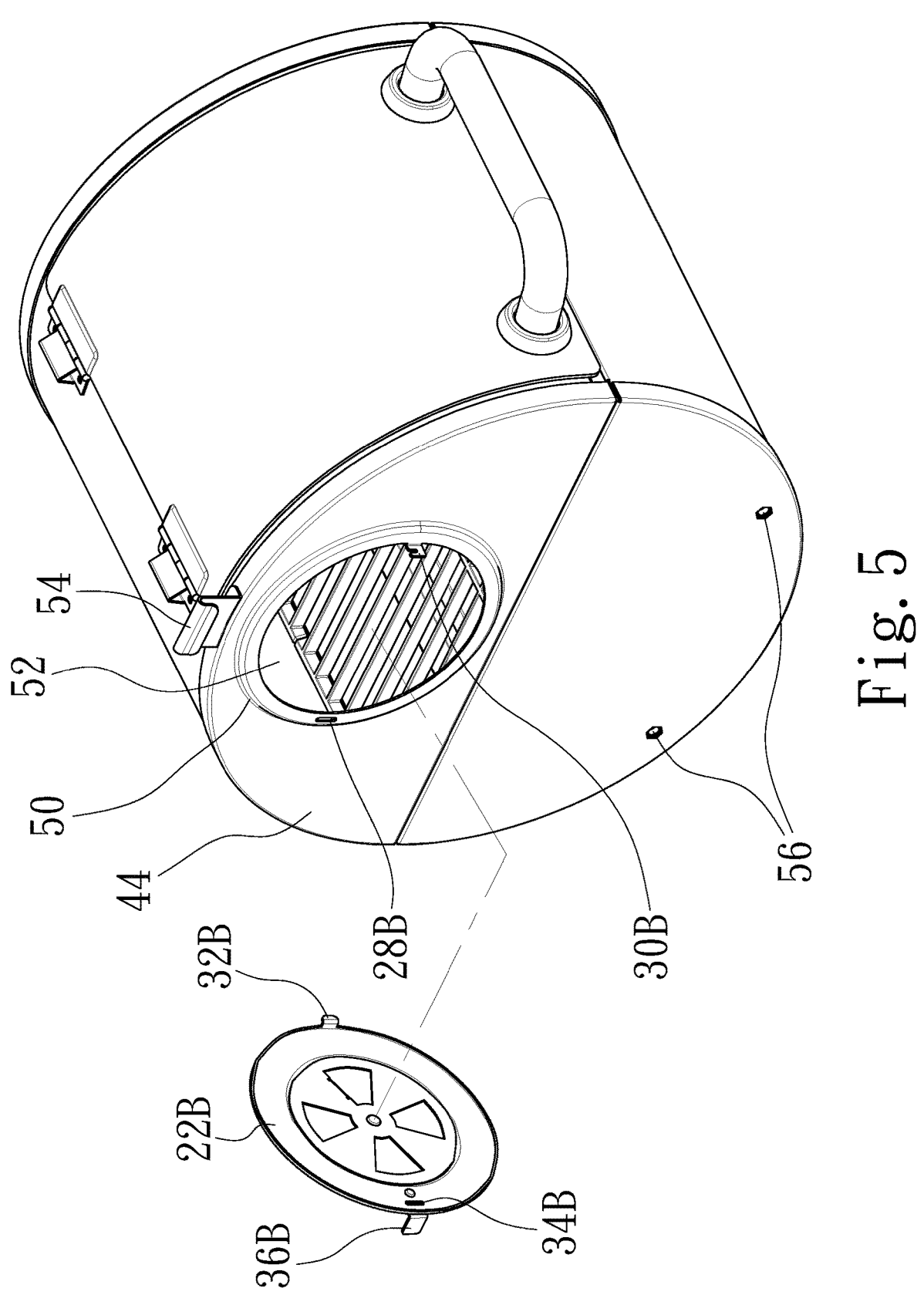
FIG. 5 is another perspective view of the secondary oven depicted in FIG. 1.

Referring to FIGS. 1, 4 and 5, the secondary oven 14 includes a bowl 44, a lid 46 and a cover 22B. In use, the bowl 44 is attached to the bowl 18. The lid 46 is pivotally connected to the bowl 44.

The bowl 44 includes a bulge 50, a vent 52, a slot 28B, a hook a claw 54 and two screw holes 56. The bulge 50 is formed on an external face of a lateral wall of the bowl 44. The vent 52 is made in the lateral wall of the bowl 44. Preferably, the bulge 50 and the vent 52 are both circular and co-centric with each other. The slot 28B is cut in the lateral wall of the bowl 44. Preferably, the slot 28B is located within the bulge 50. The hook 30B is formed on the lateral wall of the bowl 44. Preferably, the hook is located within the bulge 50. Preferably, the slot 28B and the hook are located on two opposite sides of the vent 52. The claw 54 is formed on the external face of the lateral wall of the bowl 44.

The cover 22B is identical to the cover 22A in structure. The cover 22B includes a tongue 32B, a slot 34B, a shackle 36B and a tab 38B. The tongue 32B extends from a portion of an edge of the cover 22B. Preferably, the tongue 32B is a bent element formed with a root extending in perpendicular to the cover 22B and a tip extending in parallel to the cover 22B. The tongue 32B is shaped according to the slot 28B. The slot 34B is shaped in compliance with the hook 30B. The shackle 36B is a bent element formed with a first section extending in perpendicular to a second section. The first section of the shackle 36B is pivotally connected to the cover 22B. The first section of the shackle 36B is shaped like the hook 30B. The second section of the shackle 36B facilitates handling of the shackle 36B. The tab 38B extends from the cover 22B. The tab 38B facilitates handling of the cover 22B.

The vent 52 can be shielded by the cover 22B. To this end, the cover 22B is mounted on the bulge 50. The tongue 32B is inserted in the slot 28B. The hook 30B is inserted in slot 34B. The first section of the shackle 36B is engageable with the hook 30B.

The first section of the shackle 36B can be disengaged from the hook 30B. Thus, the cover 22B can be detached from the lateral wall of the bowl 44, thereby opening the vent 52.

The second section of the shackle 36B facilitates handling of the shackle 36B. The tab 38B extends from the cover 22B. The tab 38B facilitates handling of the cover 22B.

The secondary oven 14 further includes a drawer 58. The drawer 58 is insertable into the bowl 44 through an opening 60 made in another lateral wall of the bowl 44.

The secondary oven 14 further includes a grid 62 and a net 64. In use, the grid 62 is located within the bowl 44. The grid 62 is used to support food. In use, the net 64 is located within the drawer 58, below the grid 62. The net 64 is used to support charcoal for example.

Referring to FIGS. 6 through 8, the cover 22A is detached from the bowl 18, and the cover 22B is detached from the bowl 44. The claw 54 is mounted on an edge of the lateral wall of the bowl 18 to keep the bowl 44 on the bowl 18. The bulge 50 is inserted in the recess 24. The hook 30A of the primary oven 12 is inserted in the vent 52 of the secondary oven 14. The hook 30B of the secondary oven 14 is inserted in the vent 26 of the primary oven 12. Thus, the bowl 44 is precisely positioned relative to the bowl 18. Two screws 66 are inserted in the screw holes 56 in the bowl 44 of the secondary oven 14 through two apertures 68 made in a bar 70 of the rack 16. Thus, the secondary oven 14 is properly attached to the primary oven 12.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An oven comprising:
   a bowl comprising a lateral wall formed with a vent, a slot and a hook, wherein the vent is located between the slot and the hook;
   a cover comprising a tongue and a slot, wherein the tongue of the cover is inserted in the slot of the bowl and the hook of the bowl is inserted in the slot of the cover so that the vent of the bowl is shielded by the cover, wherein the tongue is movable from the slot of the bowl and the hook is movable from the slot of the cover so that the cover is detachable from the bowl; and
   a shackle connected to the cover and movable between a locking position engaged with the hook and an unlocking position disengaged from the hook.

2. The oven according to claim 1, wherein the bowl comprises a recess for receiving the cover.

3. The oven according to claim 2, wherein the recess is concentric with the vent.

4. A smoking apparatus comprising:
   a primary oven comprising a lateral wall formed with a hook, a slot, a recess and a vent located within the recess;
   a secondary oven comprising a lateral wall formed with a hook, a slot, a bulge insertable in the recess, a vent located within the bulge, and a claw for hooking an upper edge of the lateral wall of the primary oven, wherein the hook of the secondary oven is inserted in the slot of the primary oven and the hook of the primary oven is inserted in the slot of the secondary oven so that the secondary oven is attached to the primary oven, wherein the hook of the secondary oven is movable from the slot of the primary oven and the hook of the primary oven is movable from the slot of the secondary oven so that the secondary oven is detachable from the primary oven.

5. The smoking apparatus according to claim 4, wherein the recess is concentric with the vent of the primary oven.

6. The smoking apparatus according to claim 4, wherein the bulge is concentric with the vent of the secondary oven.

7. The smoking apparatus according to claim 4, further comprising a rack for supporting the primary oven.

8. The smoking apparatus according to claim 7, wherein the rack comprises a bar for contact with the lateral wall of the secondary oven.

9. The smoking apparatus according to claim 8, further comprising a screw inserted in the lateral wall of the secondary oven through the bar of the rack.

10. The smoking apparatus according to claim 9, the lateral wall of the secondary oven comprises a screw hole for receiving the screw, wherein the bar of the rack comprises an aperture through which the screw extends.

\* \* \* \* \*